No. 836,151. PATENTED NOV. 20, 1906.
G. L. TARVER.
DRY CELL BATTERY.
APPLICATION FILED MAR. 5, 1906.

Inventor
G. L. TARVER
By
Attorney

UNITED STATES PATENT OFFICE.

GEORGE LOUIS TARVER, OF GREENFIELD, INDIANA.

DRY-CELL BATTERY.

No. 836,151.　　　Specification of Letters Patent.　　　Patented Nov. 20, 1906.

Application filed March 5, 1906. Serial No. 304,257.

*To all whom it may concern:*

Be it known that I, GEORGE LOUIS TARVER, a citizen of the United States, residing at Greenfield, in the county of Hancock and State of Indiana, have invented certain new and useful Improvements in Dry-Cell Batteries, of which the following is a full, clear, and exact description, reference being had to the accompanying drawings, forming a part hereof.

My invention has relation to improvements in dry-cell batteries; and it consists in the novel construction of battery more fully set forth in the specification and pointed out in the claim.

Figure 1:
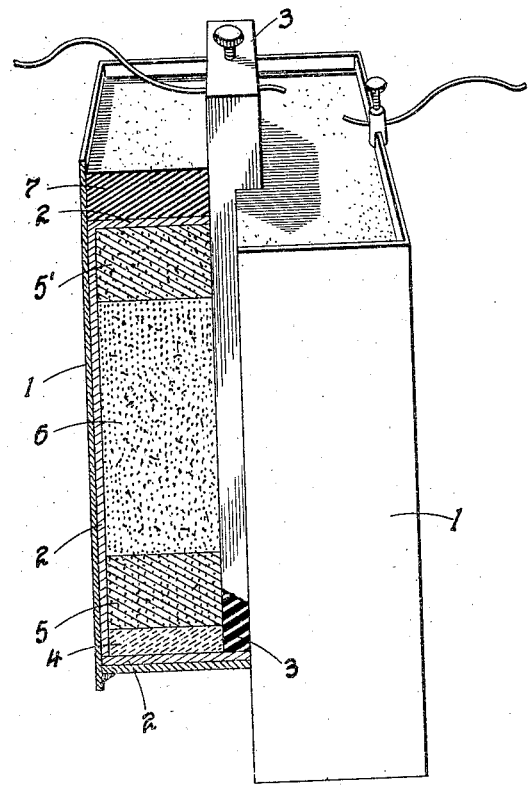
Figure 2:
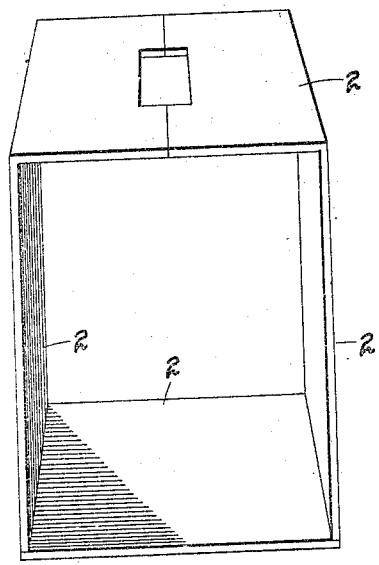

In the drawings, Figure 1 is a perspective of a half-elevation and half vertical middle section of the cell, and Fig. 2 is a perspective of the paper envelop within which the chemicals or reagents are confined.

The object of my invention is to construct a dry cell or battery which will develop a maximum efficiency, one reducing the evaporation of its volatile constituents to a minimum, and thus preserving its voltage until the chemicals and the zinc are fully exhausted, and one possessing further and other advantages better apparent from a detailed description of the invention, which is as follows.

Referring to the drawings, 1 represents the negative element or cup, composed of pure zinc sheeting thoroughly amalgamated on the inside only, all soldering of joints being effected before amalgamation. Disposed along the bottom and vertical walls of the cup is a sheet of pasteboard paper 2, folded to snugly hug the surface of the several walls, the upper ends of the paper being folded down after the cup has been filled. The carbon or negative pole 3 is inserted centrally into the cup, the said carbon element being well oxidized and rendered porous to allow for the free escape of the hydrogen. The carbon rests on the paper lining (the said lining being about one-eighth inch in thickness) and has packed around it a bottom layer of dry plaster-of-paris 4. On top of the plaster is a thicker layer of silicious sand 5, then follows a mixture of suitable chemicals with powdered carbon and manganese dioxid 6, after which is another layer of sand 5', over which the paper is folded, the whole being capped by a layer of wax 7. The layer 6 is composed of three parts of ground carbon and one of manganese (oxid) mixed with a solution which is composed of water, by weight, three parts, sal-ammoniac one part dissolved therein, combined with a cold mixture of five parts, by weight, of water and two parts of sulfuric acid. The manganese and carbon are mixed with enough of the solution (sal-ammoniac and sulfuric acid) to form a paste. The sand 5 5' is mixed with the solution in the same way before being placed in the cup. The manganese dioxid of course is used owing to its affinity for hydrogen. The sand prevents any excessive evaporation of the chemicals and holds the moisture in sufficient quantities to prevent the cell from becoming too dry—a result attended with material reduction of voltage. Of course the wax layer likewise contributes to prevent the free evaporation of the moisture contained in the sand.

Having described my invention, what I claim is—

A dry cell or battery comprising a positive cup or electrode, an inner lining of paper therefor, a negative carbon electrode resting on the lining, a surrounding bottom layer of sand enveloping the carbon electrode, a superposed layer of carbon and manganese dioxid on top of the sand, a second sand layer on the carbon and manganese-dioxid layer, and a top layer of wax for the whole, the sand and carbon and manganese-dioxid layers being mixed in the form of a paste with suitable proportions of a mixture of solutions of sal-ammoniac and sulfuric acid, substantially as set forth.

In testimony whereof I affix my signature in presence of two witnesses.

GEORGE LOUIS TARVER.

Witnesses:
　HAYWOOD JONES,
　HORACE NEAL.